United States Patent
Wei et al.

(10) Patent No.: US 7,969,642 B2
(45) Date of Patent: Jun. 28, 2011

(54) ELECTROPHORESIS DISPLAY PANEL

(75) Inventors: Chuan-Sheng Wei, Taichung County (TW); Sheng-Wen Huang, Taoyuan County (TW); Pei-Ming Chen, Taipei County (TW); Chun-Hsiun Chen, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/699,835

(22) Filed: Feb. 3, 2010

(65) Prior Publication Data

US 2011/0116157 A1    May 19, 2011

(30) Foreign Application Priority Data

Nov. 16, 2009    (TW) .............................. 98138842 A

(51) Int. Cl.
G02B 26/00    (2006.01)
(52) U.S. Cl. ...................................... 359/296; 359/290
(58) Field of Classification Search .................. 359/296, 359/245, 238
See application file for complete search history.

(56) References Cited

U.S. PATENT DOCUMENTS

| | | | | |
|---|---|---|---|---|
| 7,072,095 B2* | 7/2006 | Liang et al. | ................... | 359/296 |
| 7,411,721 B2* | 8/2008 | Ikeda | ........................... | 359/296 |
| 7,755,599 B2* | 7/2010 | Miyasaka | ..................... | 345/107 |
| 2008/0136772 A1 | 6/2008 | Minami | | |
| 2008/0158143 A1 | 7/2008 | Kim et al. | | |

FOREIGN PATENT DOCUMENTS

| CN | 101276117 | 10/2008 |
|---|---|---|
| JP | 2002-14379 | 1/2002 |

OTHER PUBLICATIONS

"First Office Action of China Counterpart Application", issued on Dec. 31, 2010, p. 1-p. 5, in which the listed references were cited.

* cited by examiner

*Primary Examiner* — Timothy J Thompson
(74) *Attorney, Agent, or Firm* — Jianq Chyun IP Office

(57) ABSTRACT

An electrophoresis display panel including an active device array substrate and an electrophoresis display film is provided. The active device array substrate includes a plurality of active devices and a shielding pattern. The electrophoresis display film is disposed on the active device array substrate. The electrophoresis display film includes a conductive layer, a dielectric layer and a plurality of electrophoresis display mediums. The dielectric layer is disposed on the conductive layer and has a plurality of micro-cups arranged in area array. The dielectric layer is between the conductive layer and the active device array substrate. Light passing through the dielectric layer is prevented from irradiating onto the active devices by the shielding pattern. In addition, the electrophoresis display mediums are filled within the micro-cups, respectively.

12 Claims, 2 Drawing Sheets

ELECTROPHORESIS DISPLAY PANEL

CROSS-REFERENCE TO RELATED APPLICATION

This application claims the priority benefit of Taiwan application serial no. 98138842, filed on Nov. 16, 2009. The entirety of the above-mentioned patent application is hereby incorporated by reference herein and made a part of specification.

BACKGROUND OF THE INVENTION

1. Field of the Invention

The present invention is related to an electrophoresis display panel, and more particular to an electrophoresis display panel with a shielding pattern.

2. Description of Related Art

Currently, due to the continuous advancement and research of the display technologies, the products such as electrophoresis displays, liquid crystal displays, plasma displays and organic-light-emitting diode displays are commercialized and applied to the display devices with various dimensions and standards. With the increasing of the use of the portable electronic devices, the flexible displays, such as electronic papers and electronic books, have gradually gathered the attentions. Generally, the electronic papers and the electronic books utilize the electrophoresis display technique to achieve the purpose of display. For instance, the pixels of the electronic book is composed of electrophoresis mediums with various colors (e.g. red, green, blue, etc.) and white charged particles doped in the electrophoresis mediums. By providing voltages to the pixels, the white charged particles are driven to shift so that each of the pixels respectively generates colorful images such as black, white, red, green, blue or the color with different color level.

In the current technologies, the electrophoresis displays utilize the reflection of the external light source to achieve the display purpose. More specifically, the colors of the electrophoresis mediums in use determines the colors displayed by the pixels and the gray level of the color displayed by each of the pixel is controlled by applying the voltage to drive the white charged particles doped in the electrophoresis mediums. Typically, the electrophoresis display is mainly composed of a thin film transistor array substrate and an electrophoresis display film. Further, in the electrophoresis display film, the dielectric layer for defining the micro-cups is made of the transparent material. After passing through the dielectric layer of the electrophoresis display film, the external light source beams on thin film transistors on the thin film transistor array substrate so that the thin film transistors generates photo currents to affect the element properties and further to result in the poor display quality of the electrophoresis display. Accordingly, how to alleviate the effect of the photo current induced by the external light source becomes an important issue to be solved immediately.

SUMMARY OF THE INVENTION

The present invention provides an electrophoresis display panel having a shielding pattern capable of effectively decreasing the photo current generated by the active device while being irradiated by the light beam.

The present invention provides an electrophoresis display panel including an active device array substrate and an electrophoresis display film. The active device array substrate comprises a plurality of active devices and a shielding pattern. The electrophoresis display film is disposed on the active device array substrate and the electrophoresis display film comprises a conductive layer, a dielectric layer and a plurality of electrophoresis display mediums. The dielectric layer is disposed on the conductive layer and has a plurality of micro-cups arranged in an array, and the dielectric layer is disposed between the conductive layer and the active device array substrate, and the shielding pattern is disposed between the dielectric layer and the active devices. Moreover, a plurality of electrophoresis display mediums disposed in the micro-cups, respectively.

In one embodiment of the present invention, each of the micro-cups has a polygonal cylinder space, an ellipse cylinder space or a circular cylinder space.

In one embodiment of the present invention, the electrophoresis display mediums are electrically insulated from the conductive layer and are separated from the conductive layer.

In one embodiment of the present invention, each of the electrophoresis display mediums includes an electrophoresis medium and a plurality of charged particles doped in the electrophoresis medium.

In one embodiment of the present invention, the electrophoresis medium is a black electrophoresis medium and the charged particles are white charged particles.

In one embodiment of the present invention, the active device array substrate further comprises a substrate, a plurality of scan lines and a plurality of data lines, and the scan lines and the data lines are disposed on the substrate. The active devices are disposed on the substrate and are electrically connected to the scan lines and the data lines, and the active devices and the shielding pattern together form a plurality of pixels, and the shielding pattern comprises a plurality of reflective pixel electrodes electrically connected to the active devices.

In one embodiment of the present invention, the active device array substrate further comprises a substrate, a plurality of scan lines, a plurality of data lines and a plurality of pixel electrodes, and the scan lines and the data lines are disposed on the substrate. The active devices are disposed on the substrate and are electrically connected to the scan lines, the data lines and the pixel electrodes, and the active devices and the shielding pattern together form a plurality of pixels, and the shielding pattern is disposed between the pixel electrodes and the active devices.

The present invention provides an electrophoresis display panel including an active device array substrate and an electrophoresis display film. The active device array substrate comprises a substrate, a plurality of scan lines disposed on the substrate, a plurality of data lines disposed on the substrate and a shielding pattern disposed in the display region. The electrophoresis display film is disposed on the active device array substrate and the electrophoresis display film comprises a conductive layer, a dielectric layer and a plurality of electrophoresis display mediums. The dielectric layer is disposed on the conductive layer and has a plurality of micro-cups arranged in an array, and the dielectric layer is disposed between the conductive layer and the active device array substrate, and the shielding pattern substantially covers at least one of the active devices. Moreover, a plurality of electrophoresis display mediums disposed in the micro-cups, respectively.

In one embodiment of the present invention, the dielectric layer is substantially transparent.

In one embodiment of the present invention, the active devices and the shielding pattern together faun a plurality of pixels, and the shielding pattern includes a plurality of reflective pixel electrodes electrically connected to the active devices.

In one embodiment of the present invention, the active devices and the pixel electrodes together form a plurality of pixels, and the shielding pattern is disposed between the pixel electrodes and the active devices.

The present invention provides an electrophoresis display panel including an active device array substrate and an electrophoresis display film. The active device array substrate comprises a plurality of active devices and a shielding pattern, wherein the shielding pattern is disposed in a display region and substantially covers at least one of the active devices. The electrophoresis display film is disposed on the active device array substrate.

Accordingly, since the electrophoresis display panel of the present invention utilizes a shielding pattern to effectively decrease the photo current generated by the active device while being irradiated by the light beam, the display quality of the electrophoresis display panel of the present invention is better.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

Figure 1:
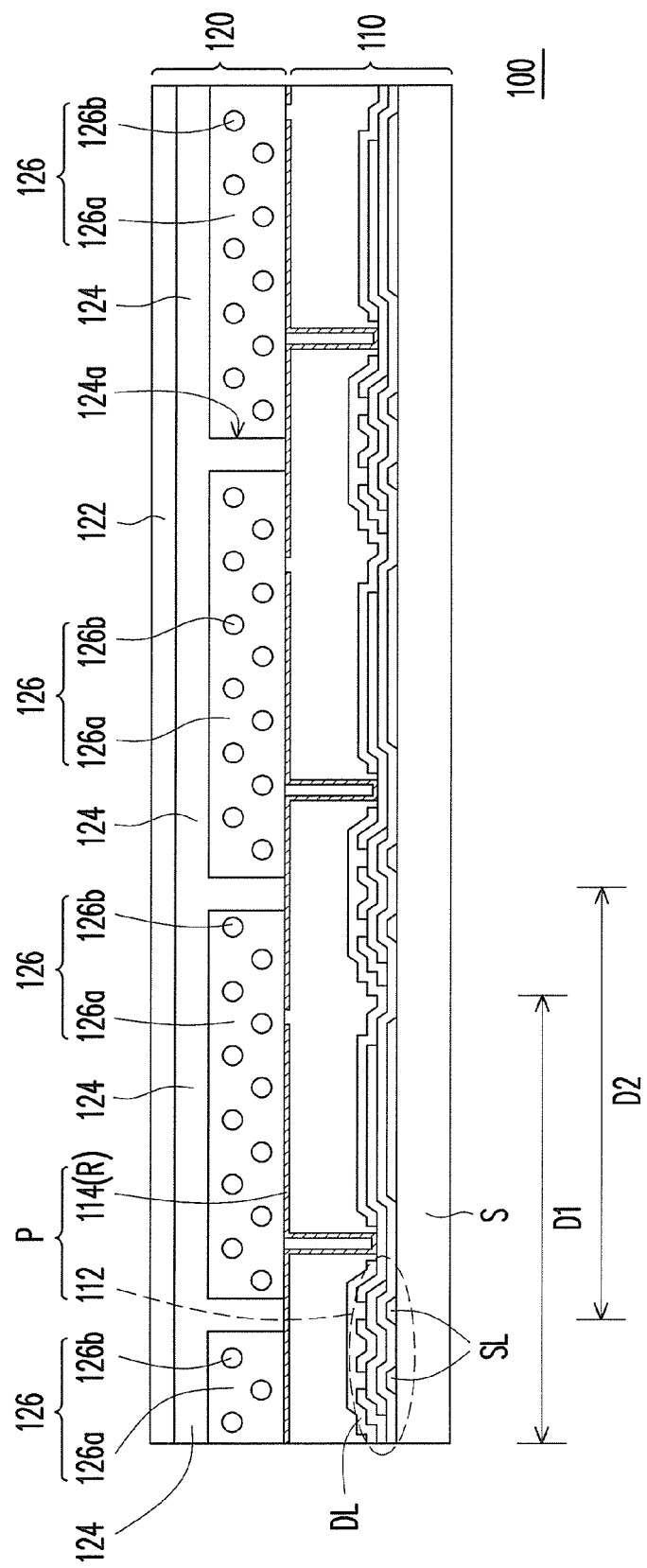
FIG. 1 schematic cross-sectional view showing an electrophoresis display panel according to the first embodiment of the present invention.

FIG. 1 schematic cross-sectional view showing an electrophoresis display panel according to the first embodiment of the present invention. Referring to FIG. 1, an electrophoresis display panel 100 of the present embodiment comprises an active device array substrate 110 and an electrophoresis display film 120. The active device array substrate 110 has a plurality of active devices 112 and a shielding pattern 114 covering the active devices 112. The electrophoresis display film 120 is disposed on the active device array substrate 110 and the electrophoresis display film 120 comprises a conductive layer 122, a dielectric layer 124 and a plurality of electrophoresis display mediums 126. As shown in FIG. 1, the dielectric layer 124 is disposed on the upper surface of the conductive layer 122 and has a plurality of micro-cups 124a arranged in an array on the bottom surface of the dielectric layer 124. Also, the dielectric layer 124 is disposed between the conductive layer 122 and the active device array substrate 100, and the shielding pattern 114, for example, is disposed between the dielectric layer 124 and the active devices 112 in order to prevent the active devices 112 from being irradiated by the light beam passing through the dielectric layer 124. From another perspective, a portion of the shielding pattern 114 is disposed within the display region of the electrophoresis display panel 100. Moreover, the electrophoresis display mediums 126 are disposed in the micro-cups 124a, respectively. Each of the micro-cups of the present embodiment can be or may have, for example, a polygonal cylinder space, an ellipse cylinder space or a circular cylinder space.

Besides the active devices 112 and the shielding pattern 114, in the present embodiment, the active device array substrate 110 further comprises a substrate S, a plurality of scan lines SL and a plurality of data lines DL. As shown in FIG. 1, the scan lines SL, the data lines DL and the active devices are all disposed on the substrate S and the active devices 112 are electrically connected to the scan lines SL and the data lines DL. Moreover, the shielding pattern 114 comprises a plurality of reflective pixel electrodes R. In other words, the shielding pattern 114 is a patterned film and each of the reflective pixel electrodes R is electrically connected to the corresponding active devices 112. Hence, a single active device 112 and a single reflective pixel electrode R in the shielding pattern together form a so-called pixel P.

As shown in FIG. 1, the electrophoresis display mediums 126 of the present embodiment are electrically insulated from the conductive layer 122 and are separated from the conductive layer 122. Moreover, the electrophoresis display mediums 126 are separated from the conductive layer 122 by the dielectric layer 124. Furthermore, in the present embodiment, each of the electrophoresis display mediums 126 includes an electrophoresis medium 126a and a plurality of charged particles 126b doped in the electrophoresis medium 126a. For instance, the electrophoresis medium 126a is a black electrophoresis medium and the charged particles 126b are white charged particles.

It should be noticed that the dimension D1 of each of the pixels P on the active device array substrate 110 is about 140 to 160 micrometers, and, more preferably, is about 150 micrometers. In addition, the dimension D2 of each of the micro-cups 124a on the electrophoresis display film 120 is about 160 to 250 micrometers, and, more preferably, is about 250 micrometers. As shown in FIG. 1, since the positions of the electrophoresis display mediums 126 are not completely aligned with the pixels P on the active device array substrate 110, a portion of the external light beam irradiates on the active device array substrate 110 by passing through the dielectric layer 124. However, the portion of the external light beam is blocked, reflected or absorbed by the reflective pixel electrodes R and it is not easy for the active devices 112 to generate the photo current.

Accordingly, the aforementioned shielding pattern 114 (i.e. the reflective pixel electrodes R) can be a single-layered metal layer, a multi-layered metal layer or other conductive material capable of blocking, reflecting or absorbing incident light beam.

The Second Embodiment

Figure 2:
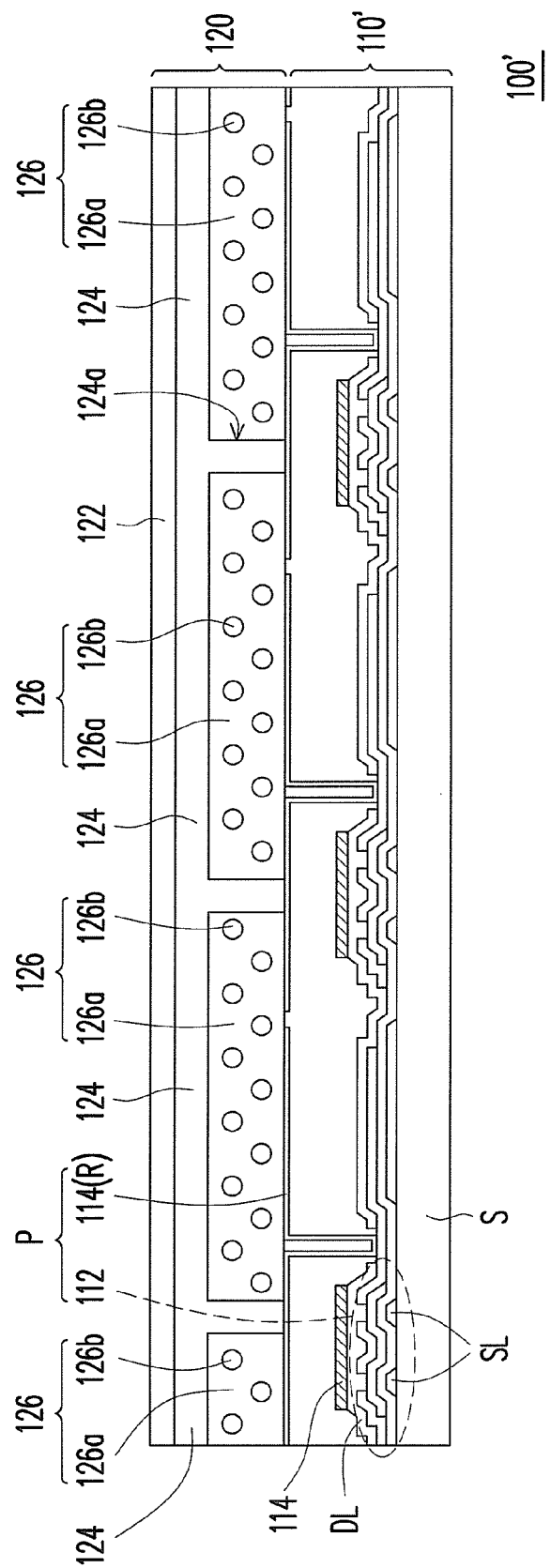
FIG. 2 schematic cross-sectional view showing an electrophoresis display panel according to the second embodiment of the present invention.

FIG. 2 schematic cross-sectional view showing an electrophoresis display panel according to the second embodiment of the present invention. As shown in FIG. 2, an electrophoresis display panel 100' of the present embodiment is similar to the electrophoresis display panel 100 described in the first embodiment. However, the difference between the electrophoresis display panel 100' and electrophoresis display panel 100 is that the shielding pattern 114 in the active device array substrate 110' of the present invention is located between the pixel electrodes PE and the active devices 112, and the active devices 112 and the pixel electrodes PE together form a plurality of pixels P. In other words, the shielding pattern 114 and the pixel electrodes PE are not parts of the same film layer, which is different from the reflective pixel electrodes R of the first embodiment.

Accordingly, the aforementioned shielding pattern 114 of the present embodiment can be a single-layered metal layer, a multi-layered metal layer, a shielding pattern made of material with the light blocking capability, a shielding pattern made of material with the light absorbing capability or other conductive material capable of blocking, reflecting or absorbing incident light beam. Herein, since the conductivity is not the major factor for choosing the material for forming the shielding pattern 114, the material of the shielding pattern 114 can be the conductive material or the non-conductive material. Thus, the material selection range of the material of the shielding pattern 114 is large.

Accordingly, since the electrophoresis display panel of the present invention utilizes a shielding pattern (e.g. reflective pixel electrodes or the shielding film between the pixel electrodes and the active devices) to effectively decrease the photo current generated by the active device while being irradiated by the light beam, the display quality of the electrophoresis display panel of the present invention is better.

What is claimed is:

1. An electrophoresis display panel, comprising:
   an active device array substrate comprising a plurality of active devices and a shielding pattern; and
   an electrophoresis display film disposed on the active device array substrate, wherein the electrophoresis display film comprises:
      a conductive layer;
      a dielectric layer disposed on the conductive layer, wherein the dielectric layer has a plurality of micro-cups arranged in an array, the dielectric layer is disposed between the conductive layer and the active device array substrate, and the shielding pattern is disposed between the dielectric layer and the active devices, and wherein the dielectric layer further has a wall located between two adjacent micro-cups; and
      a plurality of electrophoresis display mediums disposed in the micro-cups, respectively, wherein one of the active devices is overlapped with the wall.

2. The electrophoresis display panel of claim 1, wherein each of the micro-cups has a polygonal cylinder space, an ellipse cylinder space or a circular cylinder space.

3. The electrophoresis display panel of claim 1, wherein the electrophoresis display mediums are electrically insulated from the conductive layer and are separated from the conductive layer.

4. The electrophoresis display panel of claim 1, wherein each of the electrophoresis display mediums includes an electrophoresis medium and a plurality of charged particles doped in the electrophoresis medium.

5. The electrophoresis display panel of claim 4 wherein the electrophoresis medium is a black electrophoresis medium and the charged particles are white charged particles.

6. The electrophoresis display panel of claim 1, wherein the active device array substrate further comprises:
   a substrate;
   a plurality of scan lines disposed on the substrate; and
   a plurality of data lines disposed on the substrate, wherein the active devices are disposed on the substrate and are electrically connected to the scan lines and the data lines correspondingly, and the active devices and the shielding pattern together form a plurality of pixels, and the shielding pattern comprises a plurality of reflective pixel electrodes electrically connected to the active devices.

7. The electrophoresis display panel of claim 1, wherein the active device array substrate further comprises:
   a substrate;
   a plurality of scan lines disposed on the substrate;
   a plurality of data lines disposed on the substrate; and
   a plurality of pixel electrodes, wherein the active devices are disposed on the substrate and are electrically connected to the scan lines, the data lines and the pixel electrodes, correspondingly, and the active devices and the shielding pattern together form a plurality of pixels, and the shielding pattern is disposed between the pixel electrodes and the active devices.

8. An electrophoresis display panel, comprising:
   an active device array substrate, comprising:
      a substrate;
      a plurality of scan lines disposed on the substrate;
      a plurality of data lines disposed on the substrate;
      a plurality of active devices disposed on the substrate; and
      a shielding pattern disposed in a display region and substantially covering at least one of the active devices; and
   an electrophoresis display film disposed on the active device array substrate, wherein the electrophoresis display film comprises:
      a conductive layer;
      a dielectric layer disposed on the conductive layer, wherein the dielectric layer has a plurality of micro-cups arranged in an array, and the dielectric layer is disposed between the conductive layer and the active device array substrate, and wherein the dielectric layer further has a wall located between two adjacent micro-cups; and
      a plurality of electrophoresis display mediums disposed in the micro-cups, respectively, wherein one of the active devices is overlapped with the wall.

9. The electrophoresis display panel of claim 8, wherein the dielectric layer is substantially transparent.

10. The electrophoresis display panel of claim 8, wherein the active devices and the shielding pattern together form a plurality of pixels, and the shielding pattern includes a plurality of reflective pixel electrodes electrically connected to the active devices.

11. The electrophoresis display panel of claim 8, wherein the active devices and the pixel electrodes together form a plurality of pixels, and the shielding pattern is disposed between the pixel electrodes and the active devices.

12. An electrophoresis display panel, comprising:
   an active device array substrate having a plurality of active devices and a shielding pattern, wherein the shielding pattern is disposed in a display region and substantially covers at least one of the active devices; and
   an electrophoresis display film disposed on the active device array substrate.

* * * * *